(12) United States Patent
Li et al.

(10) Patent No.: US 11,818,231 B2
(45) Date of Patent: Nov. 14, 2023

(54) LOGICAL NODE DISTRIBUTED SIGNATURE DECISION SYSTEM AND A METHOD THEREOF

(71) Applicant: BEIJING ONEFLOW TECHNOLOGY CO., LTD, Beijing (CN)

(72) Inventors: Xinqi Li, Beijing (CN); Juncheng Liu, Beijing (CN); Jinhui Yuan, Beijing (CN)

(73) Assignee: BEIJING ONEFLOW TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/076,171

(22) Filed: Dec. 6, 2022

(65) Prior Publication Data

US 2023/0097489 A1 Mar. 30, 2023

Related U.S. Application Data

(63) Continuation of application No. PCT/CN2021/072786, filed on Jan. 20, 2021.

(30) Foreign Application Priority Data

Feb. 13, 2020 (CN) .......................... 202010090335.2

(51) Int. Cl.
*H04L 67/63* (2022.01)
*G06F 9/50* (2006.01)
*H04L 41/12* (2022.01)

(52) U.S. Cl.
CPC ............ *H04L 67/63* (2022.05); *G06F 9/5066* (2013.01); *H04L 41/12* (2013.01)

(58) Field of Classification Search
None
See application file for complete search history.

(56) References Cited

U.S. PATENT DOCUMENTS

| 2019/0332437 | A1  | 10/2019 | Van Hoof et al. |
| 2021/0119882 | A1* | 4/2021  | Orhan ..................... H04L 41/12 |

(Continued)

FOREIGN PATENT DOCUMENTS

| CN | 110245108 A | 9/2019 |
| CN | 110262995 A | 9/2019 |
| CN | 110955734 A | 4/2020 |

OTHER PUBLICATIONS

International Search Report of PCT/CN2021/072786.
Written Opinion of PCT/CN2021/072786.

*Primary Examiner* — Jeffrey R Swearingen
(74) *Attorney, Agent, or Firm* — Dragon Sun Law Firm, PC; Nathaniel Perkins (57) ABSTRACT

The present disclosure provides a logical node distributed signature decision system for a distributed data processing system, including: an initial logical node generating assembly, configured to receive task configuration data input by a user, and generate an initial logical node topology for the distributed data processing system, wherein a source logical node has a specified logical distributed signature, each initial logical node is attached with a candidate logical distributed signature set based on the task configuration data; and a logical distributed signature selecting assembly, configured to, according to a distributed descriptor of an output end of each upstream logical node for which a logical distributed signature is already determined, for each candidate distributed signature of a current logical node, compute a cost of data transmission required to transform the distributed descriptor of the tensor of the output end of each upstream logical node into the distributed descriptor.

6 Claims, 5 Drawing Sheets

(56) References Cited

U.S. PATENT DOCUMENTS

2021/0266228 A1* 8/2021 Reehil .................... H04L 41/122
2021/0392049 A1* 12/2021 Jeuk ........................ H04L 47/74
2022/0014441 A1* 1/2022 Sethi ....................... H04L 41/40

* cited by examiner

LOGICAL NODE DISTRIBUTED SIGNATURE DECISION SYSTEM AND A METHOD THEREOF

CROSS-REFERENCE TO RELATED APPLICATIONS

This application is a bypass continuation application of PCT application no. PCT/CN2021/072786. This application claims priorities from PCT Application No. PCT/CN2021/072786, filed Jan. 20, 2021, and from the Chinese patent application 202010090335.2 filed Feb. 13, 2020, the content of which are incorporated herein in the entirety by reference.

TECHNICAL FIELD

The present disclosure relates to data processing technologies, in particular to a logical node distributed signature decision system for a distributed data processing system and a method thereof.

BACKGROUND

Along with popularization of distributed computation, a large job or large tensor may be divided into different parts and deployed to different computing devices of different distributed data processing systems for processing, and intermediate parameters of the computation process of each part need to be processed. Thus, in a processing procedure of a specific job, a computational intermediate parameter or result deployed on one computing device may be referred to as input data of a computation task on another computing device, which may lead to data transmission overhead between the computing devices. For large job data, the transmission overhead between different computing devices will result in a large computational burden to the distributed data processing system. Therefore, in a distributed data processing system supporting data parallelism, model parallelism, hybrid parallelism and streaming parallelism, reduction of data transmission overhead between different computing devices is a problem that people have to face.

SUMMARY

The present disclosure aims to solve the aforementioned problems. In particular, the present disclosure provides a solution for configuring a logical node to reduce a volume of data transmission of intermediate parameters of job data between different computing devices of different distributed data processing systems. Specifically, according to one aspect of the present disclosure, there is provided a logical node distributed signature decision system for a distributed data processing system, including: an initial logical node generating assembly, configured to receive task configuration data input by a user, and generate an initial logical node topology for the distributed data processing system, wherein a source logical node has a specified logical distributed signature, each initial logical node is attached with a candidate logical distributed signature set based on the task configuration data, and each logical distributed signature in the candidate logical distributed signature set specifies a distributed descriptor of each input tensor and a distributed descriptor of each output tensor of the initial logical node to which the logical distributed signature belongs; and a logical distributed signature selecting assembly, configured to, according to a distributed descriptor of an output end of each upstream logical node for which a logical distributed signature is already uniquely determined, for each candidate logical distributed signature of a current logical node, based on data volume of device set to be parallel-distributed by each upstream logical node, a data volume of device set to be parallel-distributed by the current logical node and a size of a logical data block distributed by each upstream logical node on each device, compute a cost of data transmission required to transform the distributed descriptor of the tensor of the output end of each upstream logical node into the distributed descriptor of the tensor of the corresponding input end of the current logical node, and select a candidate logical distributed signature corresponding to a minimum cost value as a uniquely-determined logical distributed signature of the current logical node.

In the logical node distributed signature decision system for the distributed data processing system in the present disclosure, the logical distributed signature selecting assembly computes a cost of data transmission required for each input end of a logical node having a plurality of input ends and takes a sum of the costs of data transmissions required for all input ends as a total cost of data transmission for the current logical node to use the corresponding candidate logical distributed signature.

In the logical node distributed signature decision system for the distributed data processing system in the present disclosure, the uniquely-determined logical distributed signature determines a distribution manner of the input tensors of all input ends of the current logical node.

In the logical node distributed signature decision system for the distributed data processing system in the present disclosure, the distributed descriptor includes a split tensor descriptor, a broadcast tensor distribution descriptor and a partial sum tensor descriptor.

In the logical node distributed signature decision system for the distributed data processing system in the present disclosure, the split tensor descriptor indicates a split manner of the tensor.

According to another aspect of the present disclosure, there is provided a logical node distributed signature decision method for a distributed data processing system, including: at a initial logical node generation step, receiving task configuration data input by a user, and generating an initial logical node topology for the distributed data processing system, wherein a source logical node has a specified logical distributed signature, each initial logical node is attached with a candidate logical distributed signature set based on the task configuration data, and each logical distributed signature in the candidate logical distributed signature set specifies a distributed descriptor of each input tensor and a distributed descriptor of each output tensor of the initial logical node to which the logical distributed signature belongs; and at a logical distributed signature selection step, according to a distributed descriptor of an output end of each upstream logical node for which a logical distributed signature is already uniquely determined, for each candidate logical distributed signature of a current logical node, based on data volume of device set to be parallel-distributed by each upstream logical node, a data volume of device set to be parallel-distributed by the current logical node and a size of a logical data block distributed by each upstream logical node on each device, computing a cost of data transmission required to transform the distributed descriptor of the tensor of the output end of each upstream logical node into the distributed descriptor of the tensor of the corresponding input end of the current logical node, and selecting a candidate logical distributed signature corresponding to a minimum cost value as a uniquely-determined logical distributed signature of the current logical node.

In the logical node distributed signature decision method for the distributed data processing system in the present disclosure, the logical distributed signature selection step includes computing a cost of data transmission required for each input end of a logical node having a plurality of input ends and taking a sum of the costs of data transmissions required for all input ends as a total cost of data transmission for the current logical node to use the corresponding candidate logical distributed signature.

In the logical node distributed signature decision method for the distributed data processing system in the present disclosure, the uniquely-determined logical distributed signature determines a distribution manner of the input tensors of all input ends of the current logical node.

In the logical node distributed signature decision method for the distributed data processing system in the present disclosure, the distributed descriptor includes a split tensor descriptor, a broadcast tensor distribution descriptor and a partial sum tensor descriptor.

In the logical node distributed signature decision method for the distributed data processing system in the present disclosure, the split tensor descriptor indicates a split manner of the tensor.

In the logical node distributed signature decision system for the distributed data processing system in the present disclosure, a data exchange volume between different computing devices of the static distributed data processing system in a data processing procedure can be minimized from a global perspective, thereby reducing the overhead generated by data interaction process. Thus, the adverse influence of the data exchange for actual operations can be effectively reduced.

Other advantages, objects and features of the present disclosure will be partially embodied by the following descriptions and partially understood by those skilled in the art by research and practice on the present disclosure.

DETAILED DESCRIPTIONS OF EMBODIMENTS

The present disclosure will be further elaborated in combination with embodiments and accompanying drawings to enable those skilled in the art to practice it by referring to the specification.

The exemplary embodiments will be described in detail with illustrations shown in the drawings. When the following descriptions involve the drawings, same numerals in different drawings represent same or similar elements unless otherwise stated. The embodiments described below in the following exemplary embodiments do not represent all embodiments consistent with the present disclosure. Conversely, they are merely apparatus and method embodiments consistent with some aspects of the present disclosure as detailed in the claims.

The terms used in the present disclosure are used only for the purpose of describing specific embodiments rather than limiting the present disclosure. The singular forms "a", "said" and "the" used in the present disclosure and claims are also intended to include plural forms unless otherwise stated clearly in the context. It should be also understood that the term "and/or" used herein refers to and includes any or all possible combinations of one or more associated listed items.

It should be understood that, although various information may be described by using the terms such as first, second and third in the present disclosure, these information is not limited to these terms. These terms are used only to distinguish the same type of information from each other. For example, without departing from the scope of the present disclosure, in the context, one of two possible devices may be referred to a first logical distributed signature or a second logical distributed signature. Similarly, the other of the two possible devices may be referred to as the second logical distributed signature or the first logical distributed signature. Depending on the context, the term "if" as used herein may be interpreted as "when", "upon" or "in response to determining".

In order to enable those skilled in the art to better understand the present disclosure, the present disclosure will be further described below in details in combination with the drawings and specific embodiments.

Deep learning is essentially a type of feature learning. Based on this perspective, deep learning can be directly applied to raw data for feature extraction. An automatic encoder is one important model for achieving the function of feature extraction.

Figure 1:
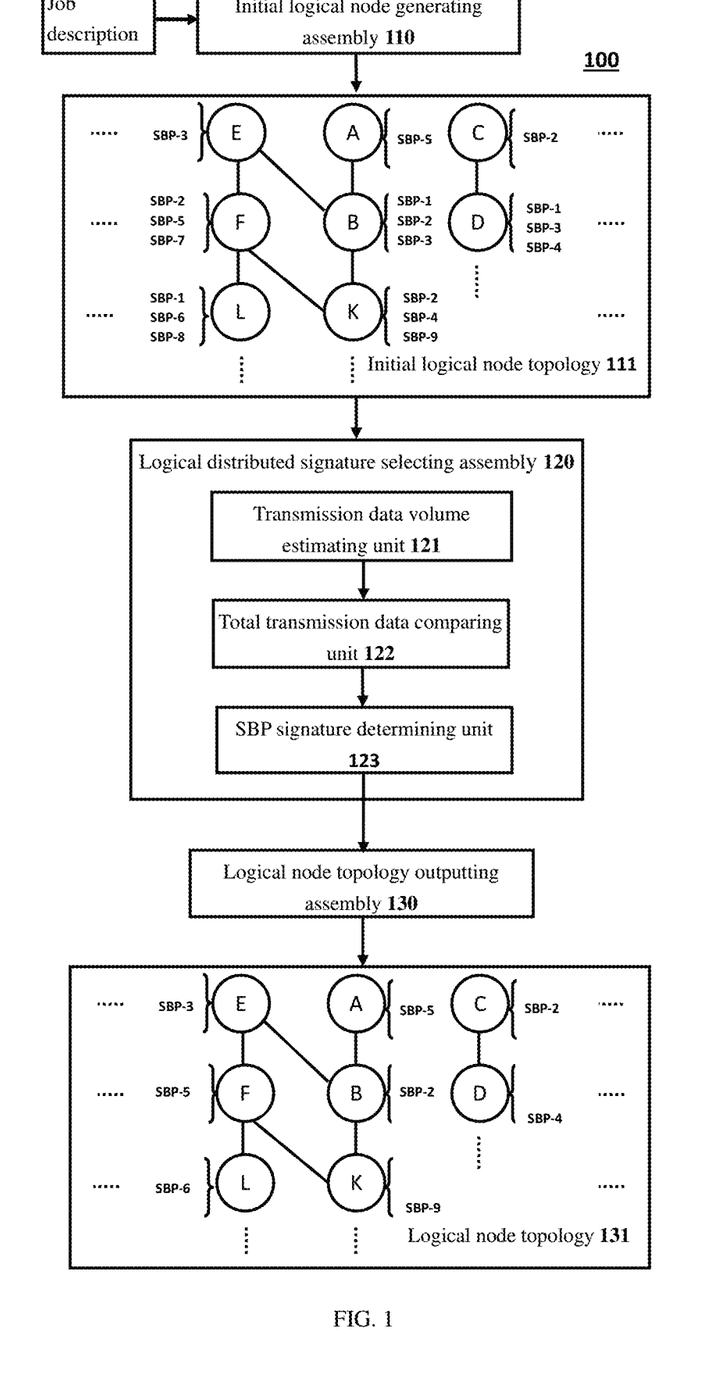
FIG. 1 is a principle schematic diagram illustrating a logical node distributed signature decision system 100 for a distributed data processing system according to the present disclosure.

FIG. 1 is a principle schematic diagram illustrating a logical node distributed signature decision system 100 for a static distributed data processing system according to the present disclosure. As shown in FIG. 1, the distributed signature decision system 100 includes an initial logical node generating assembly 110 and a logical distributed signature selecting assembly 120. The initial logical node generating assembly 110 is configured to receive task configuration data input by a user, and generate an initial logical node topology 111 for the static distributed data processing system. After a job is input, the static distributed data processing system may automatically split the job into multiple micro-job tasks based on job descriptions input by the user. These micro-job tasks include various operation constituent elements. These operation constituent elements are interconnected to form an initial tensor processing neural network topology. Each layer of the neural networks includes many logical nodes, and two adjacent layers of neural networks are interconnected so as to provide a direction for placement of an execution subject performing actual operation processing in the distributed data processing system. FIG. 1 only exemplifies a simple initial logical node topology 111, where nodes A, B, C, D, E, F, L and K are shown and other nodes are omitted. In an actual data processing, the initial logical node topology 111 will be more complex. The initial logical node topology 111 includes basic operation nodes for carrying out computation tasks described by a user. The generation manner of the initial logical node topology 111 belongs to a conventional technique of the prior art and will not be repeated herein.

Each initial logical node of the initial logical node topology 111 includes a plurality of SBP signatures. For a source logical node for which an SBP signature has been configured by a user, or an initial logical node for which a unique SBP signature is determined based on the task descriptions of the user, for example, the initial logical nodes A, E and C only have a unique SBP signature, the initial logical node A has SBP-5, the initial logical node C has SBP-2, and the initial logical node E has SBP-3. When the unique SBP signature is not determined, the initial logical node typically has inherent candidate SBP signatures. For example, the initial logical node B in FIG. 1 has a plurality of candidate SBP signatures, such as three signatures: SBP-1, SBP-2, and SBP-3. Other initial logical nodes also have respective different candidate SBP signatures, which will not be listed individually herein. Different initial logical nodes may have different inherent candidate SBP signatures based on different operations specifically executed by them.

The SBP signature according to the present disclosure is a signature applied to a distributed data processing system. Because typical distributed data processing systems usually include data parallelism, model parallelism, hybrid parallelism, streaming parallelism and the like, tasks of adjacent logical nodes are simultaneously deployed to different computing devices. Therefore, in an actual data processing procedure, intermediate parameters may be exchanged between various computing devices, resulting in a large amount of transmission overhead. For this purpose, in order to reduce the data transmission overhead, more logical nodes must be generated on the basis of the initial logical node topology 111, so as to perfect the logical node topology. In particular, in order to reduce transmission overhead between upstream and downstream logical nodes, the data distribution manner of the upstream and downstream logical nodes must be enabled to bring a minimum change. Thus, in the present disclosure, in order to obtain a better downstream logical node, a logical distributed signature is specified for each logical node. The logical distributed signature is a signature for a logical node by using a distributed descriptor of a tensor. The distributed descriptor of each tensor describes a distribution manner of each tensor in the entire computing system, mainly including: a split tensor descriptor, a broadcast tensor descriptor and a partial value tensor descriptor.

Specifically, the split tensor descriptor describes a split manner of one tensor. For example, one data block is split in a specified dimension based on description of a user and distributed to different computing devices for specified computation processing. If one data block is a two-dimensional data block, when the data block is split in a 0-th dimension, the distributed descriptor of the data tensor of one batch of data generated by the data block is S(0), and each logical data block obtains the distributed descriptor of the data tensor at its input end as S(0). Likewise, if one data block is a two-dimensional data block, when the data block is split in a first dimension, the distributed descriptor of the data tensor of one batch of data generated by the data block is S(1) and each logical data block obtains the distributed descriptor of the data tensor at its input end as S(1). Similarly, when task data to be processed has more dimensions, there will be more distributed descriptors, for example, S(2), S(3) . . . and so on. Such data mentioned herein may be processed data or model. If the data itself is split, data parallel processing is formed on the distributed data processing system, and if the model is split, model parallel processing will be formed on the distributed data processing system. If the input of the logical node is such a split tensor descriptor, in an actual data processing procedure, when a data volume of one tensor is T, the tensor will be distributed to four computing cards for data parallel computation, the data volume distributed to each card is ¼ of data and the data volume on the four cards is equal to T.

The broadcast tensor descriptor is used to describe that one tensor is published in a broadcast manner in the distributed system. Usually, for a data processing system only performing data parallelism, model data is usually broadcast to each computing device. Therefore, the broadcast data input into the logical node is described using the broadcast tensor descriptor. In an actual data processing procedure, the size of the data block of the broadcast data on each computing card is same.

The partial value tensor descriptor refers to input or output tensors of one logical node that are partial values of multiple tensors of same type. These partial values include partial sum (Ps), partial product (Pm), partial "and" result, partial maximum and partial minimum. Usually, data parallel processing is performed for data, and thus processing for data on different devices is processing for partial data. For example, some tensors are S(0) or S(1), and thus, result tensors obtained on some computing devices are S(0), and the result tensors on these computing devices are combined into the partial value tensor. A final output result can be obtained by combining the same type of data on all devices.

The descriptors of the above tensors represent the distribution manner of these tensors in the distributed computation system. Regardless of the fact that these tensors serve as input or output of a logical node, their respective distribution manners also describe the distribution of the logical node for the operation data. The present disclosure refers to such a distributed descriptor as an "SBP descriptor".

Along with generation of the initial logical node topology 111, the initial logical nodes of the present disclosure, i.e. some operation nodes, have distributed descriptors of the input and output data. These input and output distributed descriptors form a signature for a logical node, that is, a signature for an operation logical node by using a distributed descriptor of a tensor. In the present disclosure, such a signature is abbreviated as "SBP signature" using English initials of the three types of distributed descriptors.

According to the descriptions of users for computation task and requirements of data parallelism in each distributed computation system, the descriptor may include three types: S(0), B and P. If there are several split manners for data and model, one type of descriptor will be added for addition of one split manner. For each logical node, its signature includes various combination manners of these descriptors. In the distributed system according to the present disclosure, there are at least three types of distributed descriptors, and typically four types of distributed descriptors: S(0), S(1), P and B. According to different numbers of dimensions of the tensor, there will be more distributed descriptors. If there are four types of SBP descriptors, multiple SBP signatures may be formed based on the combination manner of input and output. Instances of some SBP signatures are shown below: (S(0), B)→S(0), (S(1), B)→S(1), P→P, B→B, (S(0), S(1))→P, S(0)→P, S(0)→S(0), S(0)→S(1) and P→B and so on. All SBP signatures are combination results of various SBP descriptors. For a matrix multiplication logical node, if its input tensor is split on the first dimension, its output result tensor is also split on the first dimension. S, B and P are descriptors used to describe distribution of a data block in a data processing system, and the SBP signature describes a task operation of the logical node using multiple SBP descriptors. Each data block has multiple types of SBP descriptors, and the operation manner represented by each logical node may be a case of multiple types of SBP signatures. For example, the SBP-1 shown in FIG. 1 may be the signature form (S(0), B)→S(0), and the SBP-2 may be the signature form (S(1), B)→S(1). In a practical application, different signature forms have different serial numbers, which are used herein only for convenience of descriptions and do not mean assigning one serial number to each signature. Further, no serial number may be assigned, and different forms of signatures can be distinguished from each other without serial numbers.

Based on task descriptions, the aforementioned SBP signature may be assigned to each initial logical node. Common task logical nodes are operation nodes which perform specific operations. Therefore, they have specific candidate SBP signatures. It should be noted that not each task logical node has the same SBP signature. Usually, the input tensor of the SBP signature of the task logical node performing multiplication operation does not include partial sum tensor, and thus, the SBP descriptor of its input tensor does not include the distributed descriptor P. The candidate SBP signature of the task logical node performing addition operation may include any combination of various SBP descriptors themselves. For example, for a task logical node performing matrix multiplication, in a case that there is only data parallelism, its candidate SBP signature usually is (S(0), B)→S(0), (S(1), B)→S(1) and (S(0), S(1))→P and the like. Moreover, with advancements in technology, some signatures not previously applicable to matrix multiplication may also be applied to matrix multiplication, which is only one example herein. Therefore, each initial logical node is attached with a candidate logical distributed signature set based on the task configuration data. Each logical distributed signature in the candidate logical distributed signature set specifies a distributed descriptor of each input tensor and a distributed descriptor of each output tensor of the initial logical node to which the logical distributed signature belongs.

Although the initial logical node generating assembly 110 generates the initial logical node topology 111, it is to be further determined that each initial logical node in the initial logical node topology 111 will use which SBP signature for determining a tensor or use which distributed tensor or input which distributed tensor.

In the present disclosure, the logical distributed signature selecting assembly 120 of the logical node distributed signature decision system 100 starts from a source logical node in the initial logical node topology 111. When the logical labels or SBP labels of all upstream logical nodes (e.g. logical nodes A and E) of a current logical node (e.g. logical node B) are already determined, a transmission data volume estimating unit 121 may, based on the distributed descriptors of the output ends corresponding to the input end of the logical node B of all upstream logical nodes of the logical node B for each candidate logical distributed signature of the logical node B, compute a cost of data transmission required to transform the distributed descriptor of the tensor of the output end of the each upstream logical node into the distributed descriptor of the tensor of one of the candidate logical distributed signatures of the corresponding input end of the logical node B. As shown in FIG. 1, the logical node B has many candidate SBP signatures, for example, SBP-1, SBP-2 and SBP-3. SBP-1 may be a signature in the form of, for example, (S(1), B)→S(1) or (S(1), P)→S(1), the signature SBP-5 of the initial logical node A may be a signature in the form of, for example, (S(0), B)→S(0), and the signature SBP-3 of the initial logical node E may be a signature in the form of, for example, B→B or S(0)→P. In each signature form, the left of the arrow is the distributed descriptor of the input tensor, and the right of the arrow is the distributed descriptor of the output tensor. In the present disclosure, "the tensor with the distributed descriptor as S(0)" is "S(0) tensor", "the tensor with the distributed descriptor as B" is "B tensor", "the tensor with the distributed descriptor as P" is "P tensor", and so on.

As shown in FIG. 1, if the form of the label SBP-3 of the logical node E in the initial logical node topology 111 is "S(0)→S(0)", the distributed descriptor of its output tensor is S(0) and its output tensor is S(0) tensor. If the form of the signature SBP-3 of the logical node E is "B→B" or "P→P", the distributed descriptor of its output tensor is B or P and its output tensor is B tensor or P tensor. If the candidate signature SBP-1 of the logical node B (i.e. "(S(0), S(1))→P") is selected as a determined signature, the distributed descriptor of the input tensor of the first input end of the output end of the corresponding node E must be S(0). That is, the first input end must obtain one S(1) tensor, whereas the distributed descriptor of the input tensor of the second input end of the output end of the corresponding node A must be S(0), therefore the second input end must obtain one S(0) tensor. Obviously, at this time, the distributed descriptor P of the output tensor of the node A is not consistent with the distributed descriptor S(0) of the input tensor of the first input end of the node B. Thus, in order to enable the logical node B to perform correct operations, the tensor with the distributed descriptor must be transformed as P, output by the node A into the tensor with the distributed descriptor as S(0). Similarly, if the distributed descriptor of the output tensor of the node E is S(0), it is not consistent with the distributed descriptor S(1) of the input tensor of the second input end of the node B. Thus, in order to enable the logical node B to perform correct operation, the tensor with the distributed descriptor may be transformed as S(0), output by the node E into the tensor with the distributed descriptor as S(1).

In the distributed computation system, since the operation tasks of each logical node, especially, operational tasks, are split and distributed to each computing device (e.g. computing cards CPU, GPU or TPU), in order to finally obtain a correct result, intermediate parameters must be continuously synchronized, which involves exchange of intermediate parameters between different computing devices. When the SBP descriptor of the output tensor contained in the SBP signature of the previous logical node is inconsistent with the SBP descriptor of the corresponding input tensor of the SBP signature of the current node, output transformation is usually performed in practical operation process which usually involves obtaining partial data on another computing device so as to form data desired by the input end of the current logical node together with data locally obtained, thus complying with the distributed descriptor of the data tensor of the input end of the current logical node. The process of obtaining partial data from another computing device will produce a large amount of data transmission overhead or cost. Therefore, selection of different signatures by the current logical node will produce different data transmission overheads or costs. For this purpose, the transmission data volume estimating unit 121 will estimate a data transmission overhead to be produced by each candidate signature for each logical node with undetermined signature. For example, for the logical node B, the transmission data volume estimating unit 121 can estimate a data transmission cost produced in a case of use of each of three candidate SBP signatures by the logical node B. For the logical node B, it can achieve its operation task by using any one candidate SBP signature. When using different SPB signatures, the data transmission costs produced by operation will be different. Therefore, in order to minimize the data transmission cost in a data processing procedure, a signature with a minimum data transmission volume must be selected from the candidate signatures of each logical node as a signature for actual operation processes.

For the logical node A and the logical node B in an upstream-downstream relationship in the initial logical node topology 111, the logical node A may be a source node and its SBP signature may be generated by user configuration or naturally generated based on descriptions of the user for a task, or the SBP signature of the logical node A may already be determined by decision selection based on the solution of the present disclosure, for example, the descriptor of the output tensor of the SBP signature of the logical node A is S(0). The logical node B in the initial logical node topology 111 has many candidate SBP signatures which may include (S(1),B)→S(1), B→P, S(1))→P, P→B, and the like. From the logical node A to the logical node B, since the distributed descriptor of the output tensor of the logical node A is S(0), the distributed descriptor of the corresponding input tensor of the node B may be S(1), B and P.

After the signatures of some previous logical nodes are determined, the SBP signatures of its downstream logical nodes may be finally determined based on the cost of data transmission between the logical distributed descriptor (SBP descriptor) of the output tensor of the upstream logical node and the logical distributed descriptor (SBP descriptor) of the corresponding input tensor of the candidate logical distributed signature of the downstream logical node. In this way, once the candidate SBP signature of one logical node is selected for computation, the respective SBP descriptors of the data blocks of the input end and output end of the logical node are also determined, so as to compute or estimate a total cost of data transmission of the current logical node and take the candidate logical distributed signature with a minimum total cost as the logical distributed signature of the current logical node. It is to be pointed out that if the logical distributed descriptor of the input end of some signature in the candidate signatures of the current logical node is consistent with the logical distributed descriptor of the output tensor of the upstream logical node, a candidate logical distributed signature containing the logical distributed descriptor may be preferentially selected unless the logical distributed descriptor of the tensor of other input end of the candidate logical distributed signature brings a larger final total cost.

Figure 2:
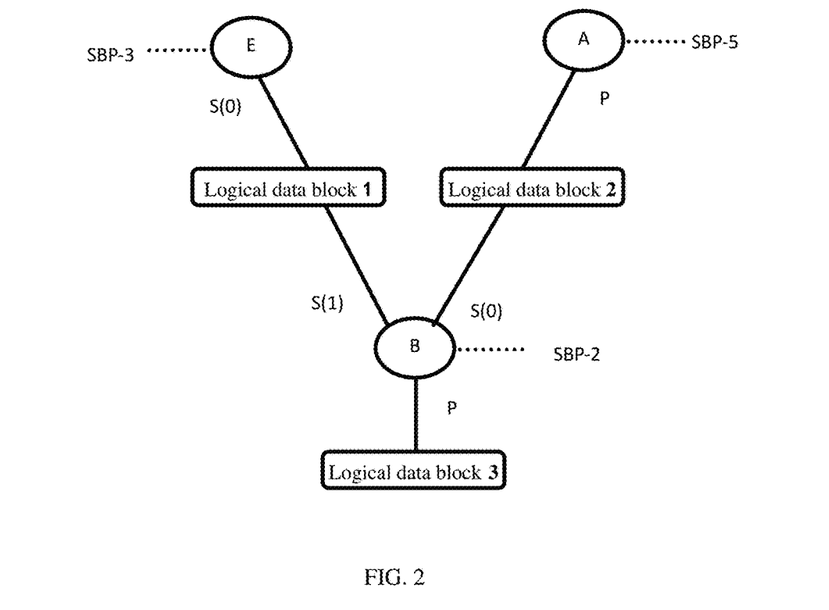
FIG. 2 is a structural schematic diagram in which a logical node distributed signature decision system 100 for a distributed data processing system decides an SBP signature according to the present disclosure.

FIG. 2 is a structural schematic diagram in which a logical node distributed signature decision system 100 for a distributed data processing system decides an SBP signature according to the present disclosure. FIG. 2 is an enlarged view of a relationship of nodes A, B and E in FIG. 1. As shown in FIG. 2, it may be assumed that the distributed descriptor of the output tensor of the determined SBP signature SBP-3 of the logical node E is S(0), the distributed descriptor of the output tensor of the determined SBP signature SBP-5 of the logical node A is P, and one candidate signature SBP-2 of the logical node B is (S(1), S(0))→P. Therefore, the SBP descriptor of the input tensor corresponding to the SBP descriptor S(0) of the output tensor of the logical node E, of the logical node B is S(1), and the SBP descriptor of the input tensor corresponding to the SBP descriptor P of the output tensor of the logical node A, of the logical node B is S(0). Thus, in order to satisfy the distribution requirements of the input logical data block of the candidate SBP signature of the logical node B, enabling the distribution of one input tensor to be transformed from the SBP descriptor S(0) of the output tensor of the logical node E into S(1), and enabling the distribution of another input tensor to be transformed from the SBP descriptor P of the output tensor of the logical node A into S(0) is required. Such transformation will generate data exchange during an actual data processing procedure.

Figure 3:
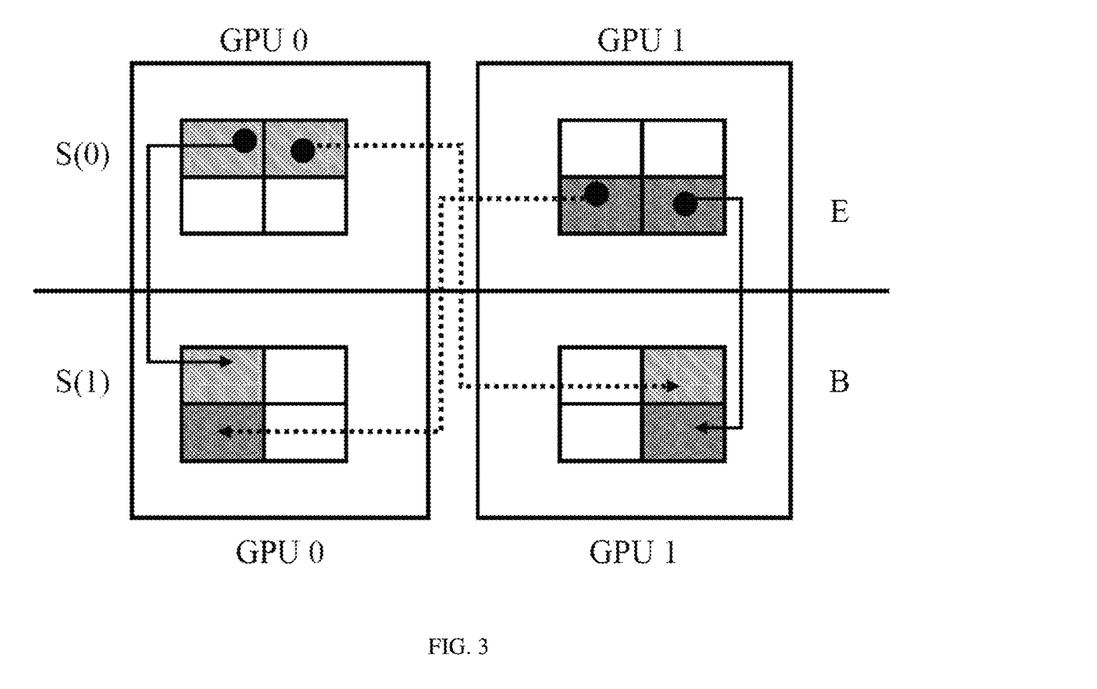
FIG. 3 is a first schematic diagram in which a transmission data volume estimating unit 121 estimates data transmission volume generated between tensors of different distributed descriptors according to the present disclosure.

FIG. 3 is a first schematic diagram in which a transmission data volume estimating unit 121 estimates data transmission volume generated between tensors of different distributed descriptors according to the present disclosure. The candidate SBP signature SBP-2 of a task node B is shown in FIG. 2 and may be assumed to be (S(1), S(0))→P. In the present disclosure, the tasks of the input source task nodes A and E and the receiving sink task node B are all distributed on a same device set. As shown in FIG. 3, the tasks are all distributed on the computing cards GPU0 and GPU1. Although only two computing cards are shown herein, the source task node and the sink task node can be actually distributed to more cards or to different device sets. FIG. 3 illustrates a data exchange process in which the input end of the task node B obtains the tensor of the descriptor S(0) in a case that the tensor of the descriptor S(0) of the task of the task node E shown in FIG. 2 is distributed on two computing cards.

If the task node of the task node B distributed on the GPU 0 is to obtain S(1), in addition to directly obtaining a half of the tensor distributed on the GPU 0 and described by the descriptor S(0) of the task node E (a solid line arrow shows the process of obtaining this part of the data), the other half of the tensor distributed on the GPU 1 and described by the descriptor S(0) of the task node E needs to be additionally obtained (a dotted line arrow shows the process of obtaining this part of the data). If the logical data block has a size of $T_1$, the data volume transmitted from the logical data block of the task node E on the GPU 1 to the task node of the task node B distributed on the GPU 0 is $T_1/2$. Further, when the task node distributed by the task node B on the GPU 1 needs to obtain S(1), in addition to obtaining directly a half of the tensor distributed on the GPU 1 and described by the descriptor S(0) of the task node E (a solid line arrow shows the process of obtaining this part of the data), the other half of the tensor distributed on the GPU 0 and described by the descriptor S(0) of the task node E needs to be additionally obtained (a dotted line arrow shows the process of obtaining this part of the data). If the logical data block has a size of $T_1$, the data volume transmitted from the logical data block of the task node E on the GPU 0 to the task node of the task node B distributed on the GPU 1 is $T_1/2$. If the tensor of the descriptor S(0) of the task node E is transformed into the tensor of the descriptor S(0) to be obtained by the input end of the task node B, the total data transmission cost is $T_1=(T_1/2+T_1/2)$, where $T_1$ is the size of the logical data block distributed by the source node. As shown in FIG. 3, the size of the logical data block is the size of the data block of S(0) distributed in the shade part on each card, that is, ½ of the entire tensor. When the number of the data cards of the device set is 3, 4 or 5, its transmission cost is still $T_1$.

Figure 4:
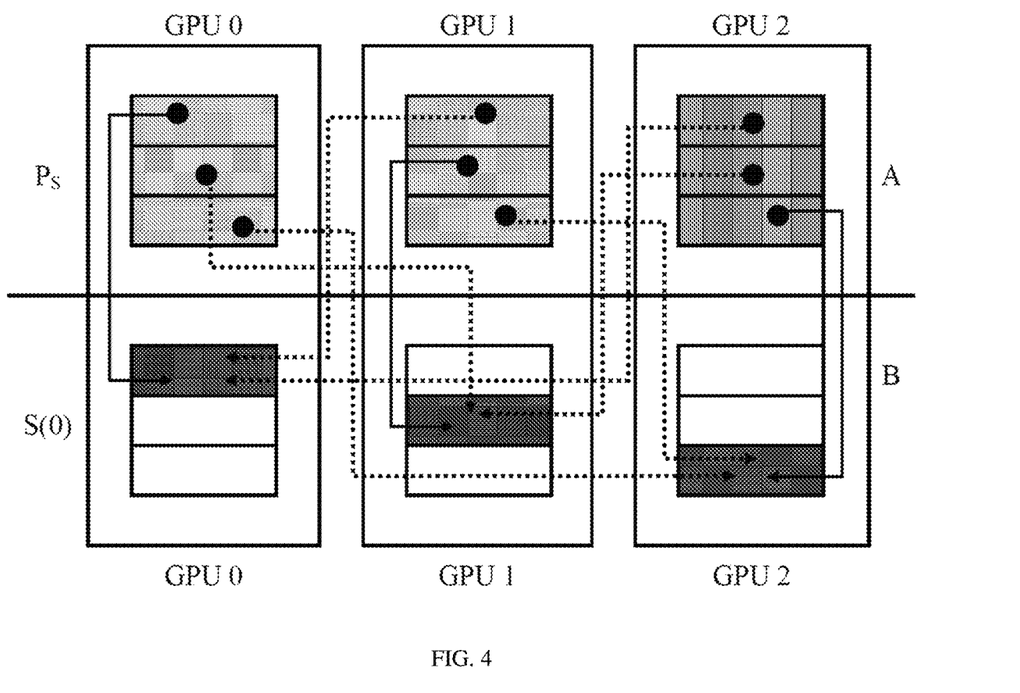
FIG. 4 is a second schematic diagram in which a transmission data volume estimating unit 121 estimates data transmission volume generated between tensors of different distributed descriptors according to the present disclosure.

FIG. 4 is a second schematic diagram in which a transmission data volume estimating unit 121 estimates data transmission volume generated between tensors of different distributed descriptors according to the present disclosure. Similarly, the candidate SBP signature SBP-2 of the task node B is shown in FIG. 2, and may be assumed to be (S(1), S(0))→P. In the present disclosure, the tasks of the input source task nodes A and E and the receiving sink task node B are all distributed on a same device set. As shown in FIG. 4, the tasks are all distributed on the computing cards GPU0, GPU1 and GPU 2. Herein, only three computing cards are illustratively shown. Further, there may be two cards as shown in FIG. 3. It should be appreciated that the source task node and the sink task node can be distributed to more cards or to different device sets. FIG. 4 illustrates a data exchange process in which the input end of the task node B obtains the tensor of the descriptor S(0) in a case that the tensor of the descriptor P of the task of the task node A shown in FIG. 2 is distributed on two computing cards.

If the task node of the task node B distributed on GPU 0 is to obtain S(0), in addition to directly obtaining ⅓ of the tensor distributed on the GPU 0 and described by the descriptor P of the task node A (a solid line arrow shows the process of obtaining this part of the data), ⅓ of the tensor distributed on the GPU 1 and described by the descriptor P of the task node A (a dotted line arrow shows the process of obtaining this part of the data) and ⅓ of the tensor distributed on the GPU 2 and described by the descriptor P of the task node A need to be additionally obtained. For this reason, a partial value tensor P is distributed on each of the three cards. For example, Ps refers to an instance of the partial sum tensor herein. If the size of the logical data block distributed by the task node A on each GPU is $T_2$, when the task node B distributed on GPU 0 is to obtain S(0) tensor, the data transmission volume $T_2/3$ from the logical data block of the task node A on the GPU 1 to the task node of the task node B distributed on GPU 0 and the data transmission volume $T_2/3$ from the logical data block of the task node A on the GPU 2 to the task node of the task node B distributed on GPU 0 need to be additionally obtained. Similarly, when the task node B distributed on GPU 1 is to obtain S(0) tensor, the data transmission volume $T_2/3$ from the logical data block of the task node A on the GPU 0 to the task node of the task node B distributed on GPU 1 and the data transmission volume $T_2/3$ from the logical data block of the task node A on the GPU 2 to the task node of the task node B distributed on GPU 1 need to be additionally obtained. Similarly, when the task node B distributed on GPU 2 is to obtain S(0) tensor, the data transmission volume $T_2/3$ from the logical data block of the task node A on the GPU 1 to the task node of the task node B distributed on GPU 2 and the data transmission volume $T_2/3$ from the logical data block of the task node A on the GPU 0 to the task node of the task node B distributed on GPU 2 need to be additionally obtained. Therefore, as shown in FIG. 4, the data transmission volume for transforming the P distributed tensor into the S(0) distributed tensor in an actual data processing procedure is $2T_2=(T_2/3+T_2/3+T_2/3+T_2/3+T_2/3+T_2/3)$. Alternatively, if the number of the computing cards to which the task node is distributed is 2, the data transmission volume is $T_2=(T_2/2+T_2/2)$. By analogy, when the source node and the sink node have a same device set, if the card number of the device set is k, the data transmission volume is $(k-1)\cdot T_2$.

As mentioned above, when the logical node B is to perform operation, the data transmission cost required for selecting a signature SBP-2 (e.g. signature (S(1), S(0))→P) is a sum of the transmission costs of two input ends. In combination with FIGS. 3 and 4 (in a case of two computing cards in FIG. 4), when the task node B has the candidate signature SBP-2, a total data volume to be transmitted is $T_1+T_2$. Therefore, the transmission cost estimated by the transmission data volume estimating unit 121 for the candidate signature SBP-1 of the logical node B needs to include the transmission costs of two input ends of the candidate signature.

For the same device sets of the source task node and the sink task node, a calculation table showing the data exchange volumes between various SBP descriptors may be summarized as Table 1 below.

TABLE 1

(the device sets to which the source task node and the sink task node are distributed are completely same, and the card number is k)

| Transformation mode | Data volume of distributed tensor of the source task node | Data exchange volume | Remarks |
|---|---|---|---|
| S(i) →S(j) | $T_1$ | 0 | i = j |
| S(i) →S(j) | $T_1$ | $T_1$ | i ≠ j |
| S→B | $T_2$ | $(K-1)\cdot T_2$ | |
| S→P | $T_3$ | $T_3$ | |
| B→S | $T_4$ | 0 | |
| B→B | $T_5$ | 0 | |
| B→P | $T_6$ | 0 | |
| P→S | $T_7$ | $(K-1)\cdot T_7$ | |
| P→B | $T_8$ | $2(K-1)\cdot T_8$ | |
| P→P | $T_9$ | 0 | |

Figure 5:
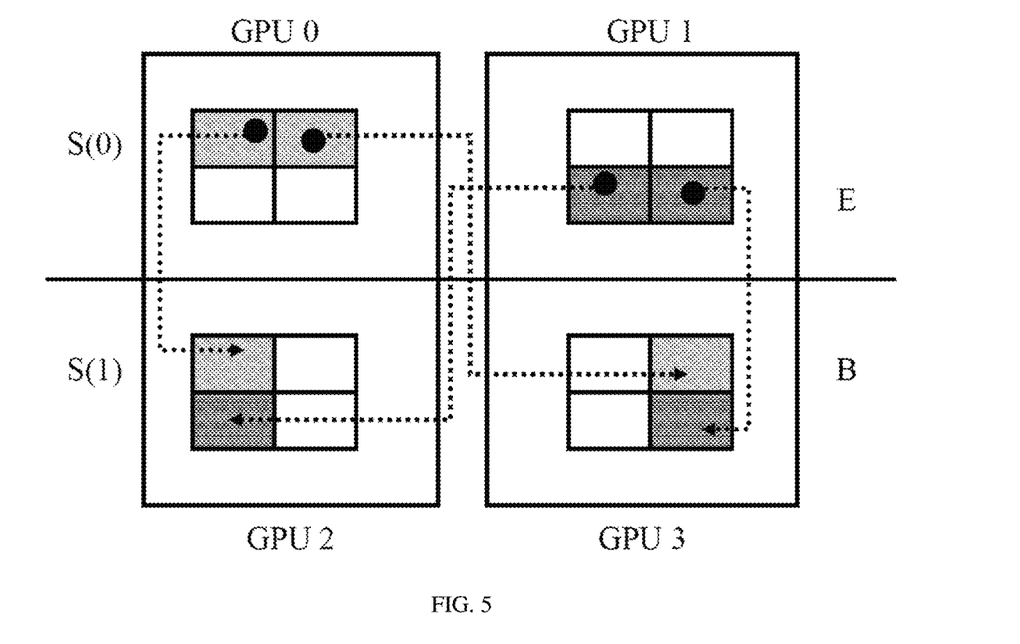
FIG. 5 is a third schematic diagram in which a transmission data volume estimating unit 121 estimates data transmission volume generated between tensors of different distributed descriptors according to the present disclosure.

FIG. 5 is a third schematic diagram in which a transmission data volume estimating unit 121 estimates data transmission volume generated between tensors of different distributed descriptors according to the present disclosure. The device set of the source node is completely different from the device set of the sink node. That is, the source task node E is distributed on GPU 0 and GPU 1, and the sink task node B is distributed on the computing cards GPU 2 and GPU 3. If the size of the logical data block distributed on each computing card is $T_3$, the data volume to be transmitted is $2T_3$.

Figure 6:
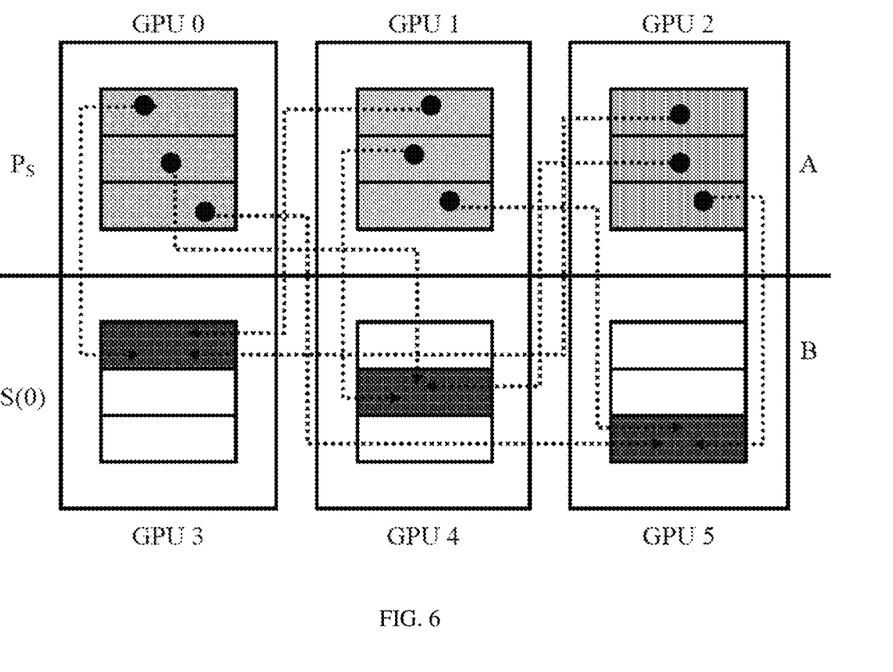
FIG. 6 is a fourth schematic diagram in which a transmission data volume estimating unit 121 estimates data transmission volume generated between tensors of different distributed descriptors according to the present disclosure.

FIG. 6 is a fourth schematic diagram in which a transmission data volume estimating unit 121 estimates data transmission volume generated between tensors of different distributed descriptors according to the present disclosure. The device set of the source node is completely different from the device set of the sink node. That is, the source task node A is distributed on GPU 0, GPU 1 and GPU 2, and the sink task node B is distributed on the computing cards GPU 3, GPU 4 and GPU 5. For example, a partial value tensor P is distributed on each of the three cards. Ps refers to an instance of the partial sum tensor. If the size of the data block of each source task node distributed to each computing card is $T_4$, the data volume to be transmitted is $9\times⅓\ T_4$, i.e. $3T_4$. If the number of the computing cards of the device set to which the source task node is distributed is 2, the data volume to be transmitted is $2T_4$. If the number of the computing cards of the device set to which the source task node A is distributed is Ks, the data volume to be transmitted is $Ks \cdot T_4$.

For the completely different device sets of the source task node and the sink task node, a calculation table showing the data exchange volumes between various SBP descriptors may be summarized as Table 2 below.

TABLE 2

(the device sets to which source task node (card number is $K_s$) and sink task node (card number is $K_d$) are respectively distributed are completely different)

| Transformation mode | Data volume of distributed tensor of the source task node | Data exchange volume | Remarks |
|---|---|---|---|
| S(i) →S(j) | $T_1$ | $T_1$ | i ≠ j |
| S→B | $T_2$ | $K_d \cdot T_2$ | |
| S→P | $T_3$ | $T_3$ | |
| B→S | $T_4$ | 1 | |
| B→B | $T_5$ | $K_d \cdot T_5$ | |
| B→P | $T_6$ | $T_6$ | |
| P→S | $T_7$ | $K_s \cdot T_7$ | |
| P→B | $T_8$ | $K_s \cdot K_d \cdot T_8$ | |
| P→P | $T_9$ | $K_s \cdot T_9$ | |

Figure 7:
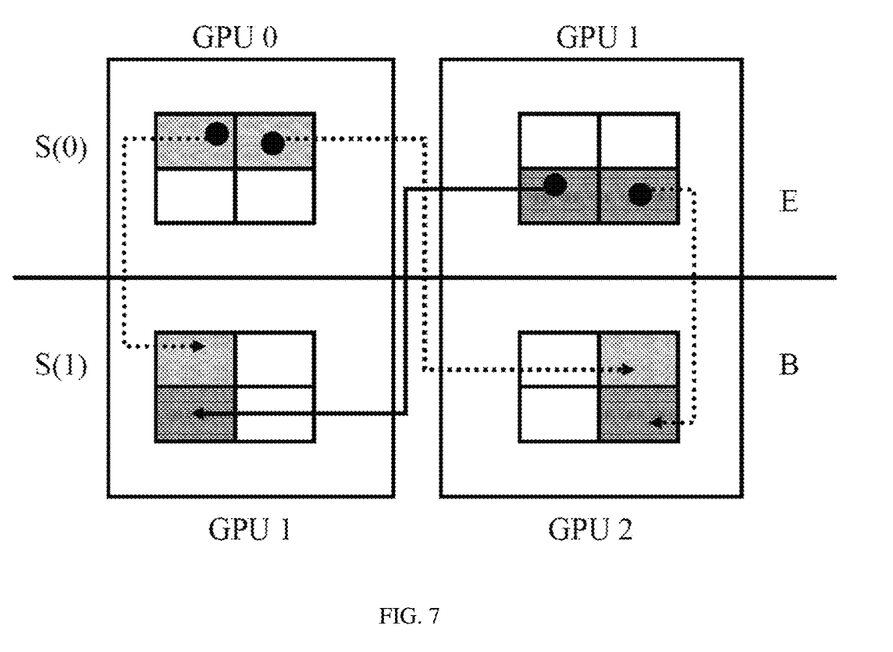
FIG. 7 is a fifth schematic diagram in which a transmission data volume estimating unit 121 estimates data transmission volume generated between tensors of different distributed descriptors according to the present disclosure.

FIG. 7 is a fifth schematic diagram in which a transmission data volume estimating unit 121 estimates data transmission volume generated between tensors of different distributed descriptors according to the present disclosure. The device set of the source node is not completely identical to the device set of the sink node. That is, the source task node E is distributed on GPU 0 and GPU 1, and the sink task node B is distributed on the computing cards GPU 1 and GPU 2. If the size of the data block of each source task node distributed to the computing card is $T_5$, the data volume to be transmitted is $3/2\ T_3 = (½\ T_3 + ½\ T_3 + ½\ T_3)$. In this case, the computation has no fixed law and shall be performed based on specific composition of the actual device set and intersection thereof.

Figure 8:
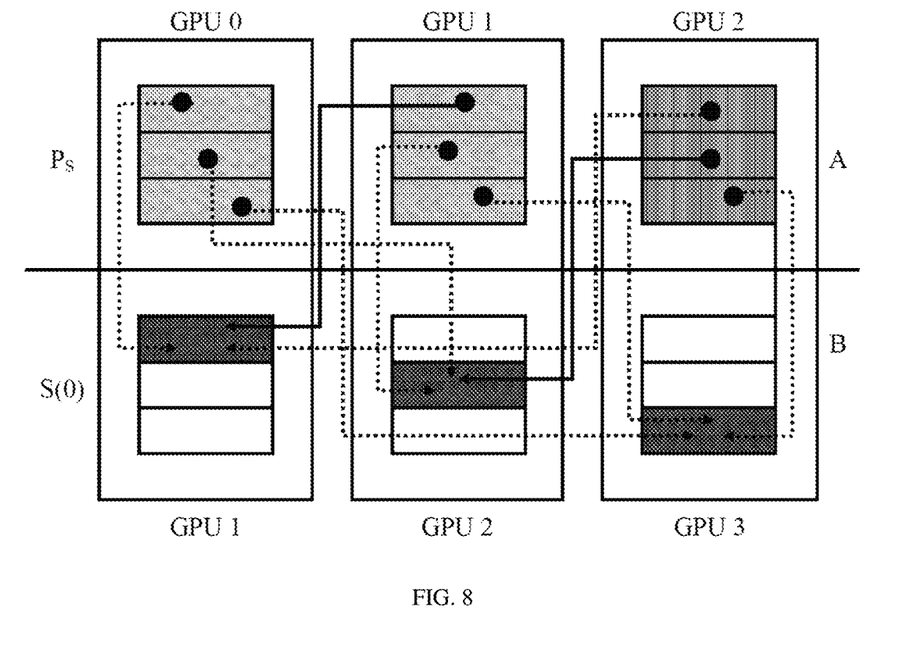
FIG. 8 is a sixth schematic diagram in which a transmission data volume estimating unit 121 estimates data transmission volume generated between tensors of different distributed descriptors according to the present disclosure.

FIG. 8 is a sixth schematic diagram in which a transmission data volume estimating unit 121 estimates data transmission volume generated between tensors of different distributed descriptors according to the present disclosure. The device set of the source node is not completely identical to the device set of the sink node. That is, the source task node A is distributed on GPU 0, GPU 1 and GPU 2, and the sink task node B is distributed on the computing cards GPU 1, GPU 2 and GPU 3. For example, a partial value tensor P is distributed on each of the three cards. Ps refers to an instance of the partial sum tensor. If the size of the data block of each source task node distributed to the computing card is $T_6$, the data volume to be transmitted is $7 \times ⅓\ T_4$, i.e. $7/3T_4$. In this case, the computation has no fixed law and shall be performed based on specific composition of the actual device set and intersection thereof.

As mentioned above, the transmission data volume estimating unit 121 traverses all candidate signatures SBP-1, SBP-2 and SBP-3 of the logical node B in the above manner, and obtains a transmission cost of each signature. Next, a total transmission data comparing unit 122 compares the transmission cost under each candidate signature and obtains a minimum transmission cost of a to-be-determined logical node, for example, the logical node B. Finally, an SBP signature determining unit 123 determines a candidate SBP signature corresponding to the minimum transmission cost as the final SBP signature of the logical node B.

Finally, a logical node topology outputting assembly 130 outputs a final logical node topology 131 based on the SBP signature determined by the SBP signature determining unit 123 for each logical node. Each logical node forming the logical node topology 131 is only attached with one SBP signature, or each logical node clearly specifies a distribution manner or a distributed descriptor of its each input tensor and uniquely determines the distribution manner or the distributed descriptor of its each input tensor.

Although the above shows a case in which a final SBP signature is determined from some candidate SBP signatures, in some special cases, for some logical nodes, when a user has a special configuration or they are specified by the user, these logical nodes only have the SBP signatures specified by the user. Therefore, its downstream logical node determines an SBP signature based on the specially-specified upstream logical node.

In the logical node distributed signature decision system for the distributed data processing system in the present disclosure, a data exchange volume between different computing devices of the static distributed data processing system in a data processing procedure can be minimized from a global perspective, thereby reducing the overhead generated by data interaction process. This way, the adverse influence of the data exchange during actual operation can be effectively reduced, and the waiting time for operations is shortened, thereby speeding up data processing.

The basic principle of the present disclosure is described above in combination with specific embodiments. It is to be pointed out that those skilled in the art may understand that any or all steps or components in the method and apparatus of the present disclosure can be implemented by use of hardware, firmware, software or their combination in any computing apparatus (including processor, storage medium and the like) or in a network of the computing apparatus. The above can be achieved by persons of ordinary skill in the art based on their basic programming skills after reading the specification of the present disclosure.

Therefore, the object of the present disclosure may be further achieved by running one program or one group of programs in any computing apparatus. The computing apparatus may be a well-known general apparatus. Thus, the object of the present disclosure may also be achieved only by providing a program product containing program codes for implementing the method or apparatus. That is, the program product forms the present disclosure and a storage medium storing the program product also forms the present disclosure. Apparently, the storage medium may be any well-known storage medium or any storage medium developed in the future.

It is to be pointed out that in the apparatus and method of the present disclosure, apparently, various components or steps may be decomposed and/or re-combined. These decompositions and/or re-combinations shall be considered as equivalent solution of the present disclosure. Further, the steps for performing the above series of processing may be naturally performed in a time sequence shown herein, but not necessarily performed in the time sequence. Some steps may be performed in parallel or separately.

The above specific embodiments do not constitute any limitation to the scope of protection of the present disclosure. Those skilled in the art should understand that, depending on design elements and other factors, various modifications, combinations, sub-combinations and replacements may be made. Any modifications, equivalent substitutions and improvements made within the spirit and principle of the present disclosure shall all fall within the scope of protection of the present disclosure.

What is claimed is:

1. A logical node distributed signature decision method for a distributed data processing system, comprising:
   at a initial logical node generation step, receiving task configuration data input by a user, and generating an initial logical node topology for the distributed data processing system, wherein a source logical node has a specified logical distributed signature, each initial logical node is attached with a candidate logical distributed signature set based on the task configuration data, and each logical distributed signature in the candidate logical distributed signature set specifies a distributed descriptor of each input tensor and a distributed descriptor of each output tensor of the initial logical node to which the logical distributed signature belongs; and
   at a logical distributed signature selection step, according to a distributed descriptor of an output end of each upstream logical node for which a logical distributed signature is already uniquely determined, for each candidate logical distributed signature of a current logical node, based on data volume of device set to be parallel-distributed by each upstream logical node, a data volume of device set to be parallel-distributed by the current logical node and a size of a logical data block distributed by each upstream logical node on each device, computing a cost of data transmission required to transform the distributed descriptor of the tensor of the output end of each upstream logical node into the distributed descriptor of the tensor of the corresponding input end of the current logical node, and selecting a candidate logical distributed signature corresponding to a minimum cost value as a uniquely-determined logical distributed signature of the current logical node.

2. The logical node distributed signature decision method for the distributed data processing system according to claim 1, wherein the logical distributed signature selection step comprises computing a cost of data transmission required for each input end of a logical node having a plurality of input ends and taking a sum of the costs of data transmissions required for all input ends as a total cost of data transmission for the current logical node to use the corresponding candidate logical distributed signature.

3. The logical node distributed signature decision method for the distributed data processing system according to claim 1, wherein the uniquely-determined logical distributed signature determines a distribution manner of the input tensors of all input ends of the current logical node.

4. The logical node distributed signature decision method for the distributed data processing system according to claim 3, wherein the distributed descriptor comprises a split tensor descriptor, a broadcast tensor distribution descriptor and a partial value tensor descriptor.

5. The logical node distributed signature decision method for the distributed data processing system according to claim 4, wherein the split tensor descriptor indicates a split manner of the tensor.

6. The logical node distributed signature decision method for the distributed data processing system according to claim 2, wherein the uniquely-determined logical distributed signature determines a distribution manner of the input tensors of all input ends of the current logical node.

* * * * *